United States Patent
Knelsen et al.

(10) Patent No.: US 6,918,884 B2
(45) Date of Patent: Jul. 19, 2005

(54) VIBRATING LUMBAR SUPPPORT

(75) Inventors: John Knelsen, Leomington (CA); Reinold Kosciuw, Tecumseh (CA)

(73) Assignee: L&P Property Management Company, South Gate, CA (US)

( * ) Notice: Subject to any disclaimer, the term of this patent is extended or adjusted under 35 U.S.C. 154(b) by 308 days.

(21) Appl. No.: 09/952,961

(22) Filed: Sep. 14, 2001

(65) Prior Publication Data

US 2003/0055364 A1 Mar. 20, 2003

(51) Int. Cl.$^7$ .............................. A61H 1/00; A47C 7/14
(52) U.S. Cl. ..................................... 601/57; 297/284.4
(58) Field of Search .............................. 601/46, 49, 51, 601/53, 54, 86, 89–92, 57; 297/284.1, 284.3, 284.7, 284.8

(56) References Cited

U.S. PATENT DOCUMENTS

| | | | |
|---|---|---|---|
| 2,921,578 A | 1/1960 | Rabhan ........................ 128/33 |
| 3,405,709 A | 10/1968 | Mathers ........................ 128/33 |
| 3,446,204 A | 5/1969 | Murphy ........................ 128/33 |
| 4,544,867 A | 10/1985 | Jones, Jr. et al. ............ 318/129 |
| 4,833,614 A | 5/1989 | Saitoh et al. ........... 364/424.05 |
| 4,880,271 A * | 11/1989 | Graves ..................... 297/284.4 |
| 5,140,977 A * | 8/1992 | Raffel ........................... 601/46 |
| 5,217,278 A * | 6/1993 | Harrison et al. ......... 297/284.7 |
| 5,330,416 A | 7/1994 | Masuda et al. ............... 601/52 |
| 5,651,583 A * | 7/1997 | Klingler et al. .......... 297/284.4 |
| 5,704,687 A * | 1/1998 | Klingler ................... 297/284.4 |
| 5,713,832 A * | 2/1998 | Jain ............................ 601/49 |
| 5,913,569 A * | 6/1999 | Klingler ................... 297/284.4 |
| 6,227,618 B1 * | 5/2001 | Ligon et al. ............. 297/284.4 |
| 6,430,801 B1 * | 8/2002 | Cosentino ..................... 29/457 |
| 6,682,494 B1 * | 1/2004 | Sleichter et al. .............. 601/57 |
| 6,758,522 B2 * | 7/2004 | Ligon et al. ............. 297/284.4 |

FOREIGN PATENT DOCUMENTS

| | | | | |
|---|---|---|---|---|
| DE | 42 20 995 A1 | 1/1994 | ............ A47C/7/46 |
| DE | 195 05 445 A1 | 8/1996 | .......... A61H/15/00 |
| WO | WO 95/31918 | 11/1995 | ............ A47C/7/46 |

* cited by examiner

Primary Examiner—Gregory L. Huson
Assistant Examiner—Fenn C. Mathew
(74) Attorney, Agent, or Firm—Dennis J. M. Donahue, III; Grant D. Kang; Husch & Eppenberger LLC

(57) ABSTRACT

A vibrating lumbar support transmits vibrations from an electromagnetic pulse vibrator through a vibration plate, guide rods, an arching pressure surface and then to a seat occupant. The vibrating unit may also transmit vibrations to a seat occupant through a push paddle type lumbar support or through a sinuous wire type lumbar support.

40 Claims, 15 Drawing Sheets

VIBRATING LUMBAR SUPPPORT

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

1. Field of the Invention

This invention relates to lumbar supports and a method and apparatus for vibrating lumbar supports.

2. Introduction

Components directed towards promoting the comfort of seat occupants, particularly automobile passengers, have become an increasingly large and complex market. Ergonomic devices currently available for installation in the limited space within a seat include posture support mechanisms such as lumbar supports, mechanisms to ameliorate long term positional discomfort such as massagers and vibrators, and even temperature regulation ducts. There is a continuing need in the art for saving space, for decreasing the costs of materials, packaging and assembly, and for offering the manufacturers of automobiles, boats, airplanes, office furniture, physical therapy equipment and the like a full spectrum of combined features for their seats.

Customizable lumbar support devices are known. Generally they may be categorized in various families such as arching pressure plates, arched push paddles, arching pressure baskets, arching ribs, pneumatic bladders, or shapeable, sinuous wires. Broadly, each of these families is actuated by mechanical means, commonly a bowden cable, electric motors, or electric air pumps. Arching pressure plates may be arched by compression or traction. Means for installation of customizable lumbar supports include direct fixation to seat frames or back plates, assembly by attachment of lumbar support guide rods to seat frames, or clamping onto a wire mat behind a seat cushion.

Customizable lumbar supports have been designed to move up and down, as well as in and out, and various configurations of supports, alone or in combination, have been made to support various body parts.

Vibrators are known and include actuation by electromagnet, air pulse or motors with eccentric weights. These devices have rarely been incorporated into seats, and then simply by clamping them to a fixed wire mat (static lumbar support) in order to put the vibrator's plate in contact with the cushion facing the seat occupant.

Massage mechanisms have been incorporated into customizable lumbar supports installed in seats, and have been combined with various lumbar support configurations. But these mechanisms are expensive and bulky. They are useful for large, expensive luxury automobiles, but not for smaller models where cost is an issue. Lumbar support mechanisms can be made compactly and economically, but after they have been adjusted to the passengers liking, they remain static.

There is a need in the art for a device combining customizable posturing support and amelioration of positional discomfort that is economical and compact. Such a device would offer seat manufacturers a new mid-tier product between the static lumbar support and the full lumbar massage options.

BRIEF SUMMARY OF THE INVENTION

The present invention is a vibrating customizable lumbar support. In a preferred embodiment, an electromagnetic is dimensioned to cooperate with an arching lumbar support by placement between two vertical guide rods. The arching pressure surface slides along these rods at an upper and a lower sliding connection. The shape of the arch is variable with adjustment by a passenger of a traction device, to wit, a bowden cable. Once adjusted, the pressure surface remains in the selected shape until adjusted again.

The vibration unit vibrates two adjacent plates which may be tightened flat together by bolts. The present invention mounts the vibrator in a compact fashion that conserves vibration loss and transfers the majority of force to the seat occupant by sandwiching the guide rods between the two vibration plates. Vibration originates in the electromagnet, travels through the vibration plates, then travels through the guide rods, then travels through the arched pressure surface, and then travels through the seat cushion to the passenger.

It is contemplated that the present invention encompass a variety of equivalent embodiments for mounting, vibration actuation, vibration transfer and lumbar support devices that may be made to vibrate.

Further features and advantages of the present invention, as well as the structure and operation of various embodiments of the present invention, are described in detail below with reference to the accompanying drawings.

DETAILED DESCRIPTION OF THE INVENTION

Figure 1:
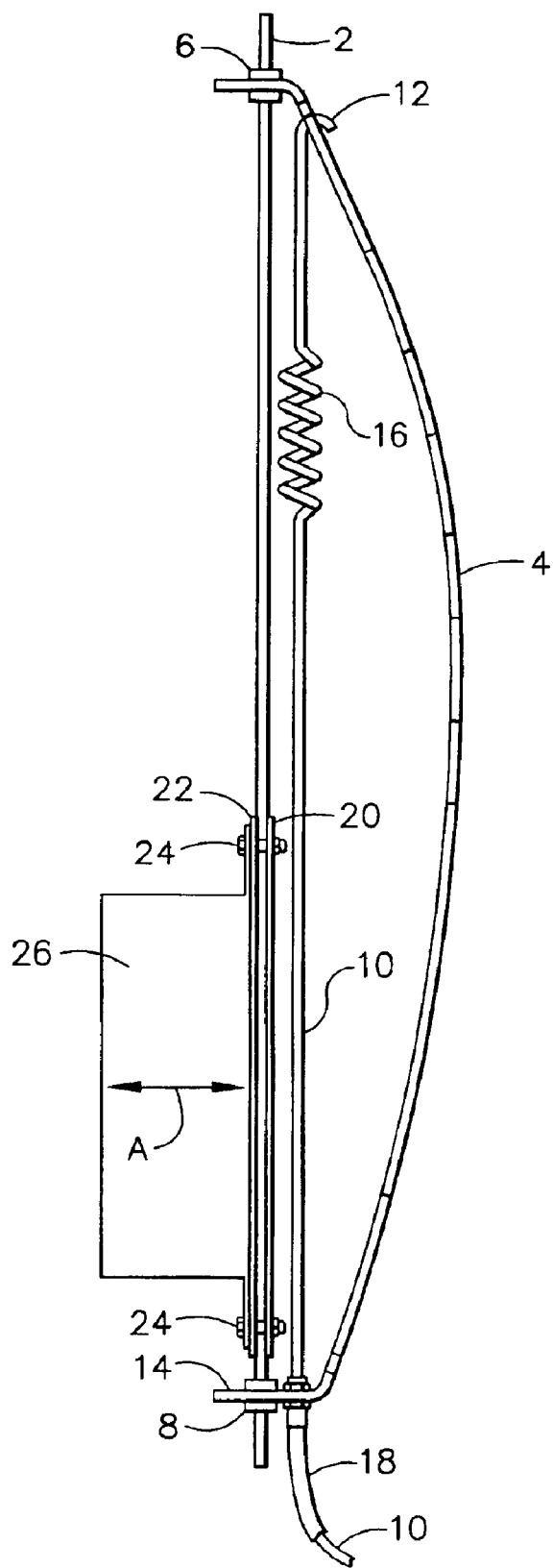
FIG. 1 is a side view of the vibrating lumbar support of the present invention.

Referring to the accompanying figures in which like reference numbers refer to like elements, FIG. 1 is a side view of the present invention. Guide rods 2 (a second rod is obscured behind the first) are adapted to be fixedly attached to a seat frame (not shown) at their uppermost and lowermost ends. Alternatively and equivalently, guide rods 2 may be attached to a wire mat, which is a substantially flat web or network of wire, or they may be attached to a back plate. Alternatively and equivalently, guide rods 2 may be rails, bars, stiff wire or other thin rigid elements.

Arching pressure surface 4, here shown in a slightly arched position, engages guide rods 2 at an upper member 6 and a lower member 8. All four of these engaging eyes may slide along the guide rods 2, or either the upper pair or the lower pair my slide, with the opposing pair fixed. In either case, the slidingly engaged eyes are in close cooperation with the guide rods 2 in a junction tight enough to prevent unwanted vibration of the junction. This sliding engagement allows the pressure surface to arch when arching force is applied.

Traction wire 10 is fixedly attached to the pressure surface upper member at 12. Traction wire 10 slides axially through bowden cable conduit 18, which is fixedly attached to the pressure surface lower member at 14. Tractive force is mediated by spring 16. Tractive force is controlled mechanically or electrically at a bowden cable opposite end (not shown), which draws the wire 10 into the conduit 18 to arch the pressure surface by correspondingly drawing the fixed traction wire mount 12 towards the fixed conduit mount 14. When tractive force on the bowden cable is relaxed, the inherent bias of the pressure surface to return to its flat shape reduces the arch.

The vibrator is enclosed within housing 26. Vibration plates 20 and 22 clamp between them guide rods 2. This fixed attachment is held by nuts and bolts 24, or any equivalent fixator. The vibrator oscillates along the axis indicated by arrow A, vibrating vibration plates 22 and 20. Vibration is transferred through guide rods 2 to pressure surface 4, and from there to the seat occupant.

Figure 2:
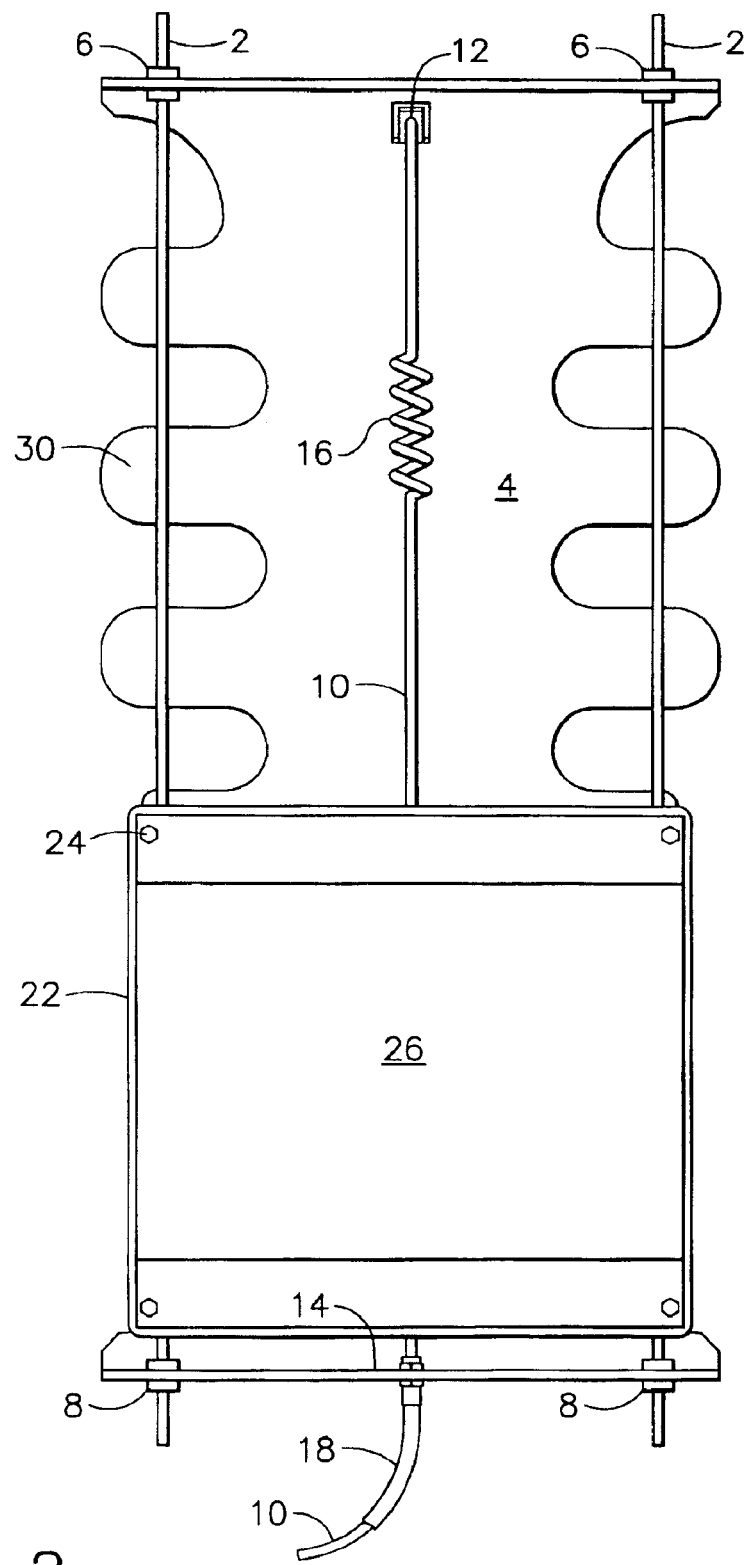
FIG. 2 is a back view of the vibrating lumbar support of the present invention.

FIG. 2 is a back view of the present invention. In addition to the elements identified in FIG. 1, the preferred rib structure of the pressure surface is depicted, showing a plurality of ribs, 30. Ribs, 30, are fixedly attached to pressure surface, 4, or fabricated in unison with it, as by stamping from a single piece of metal.

Figure 14:
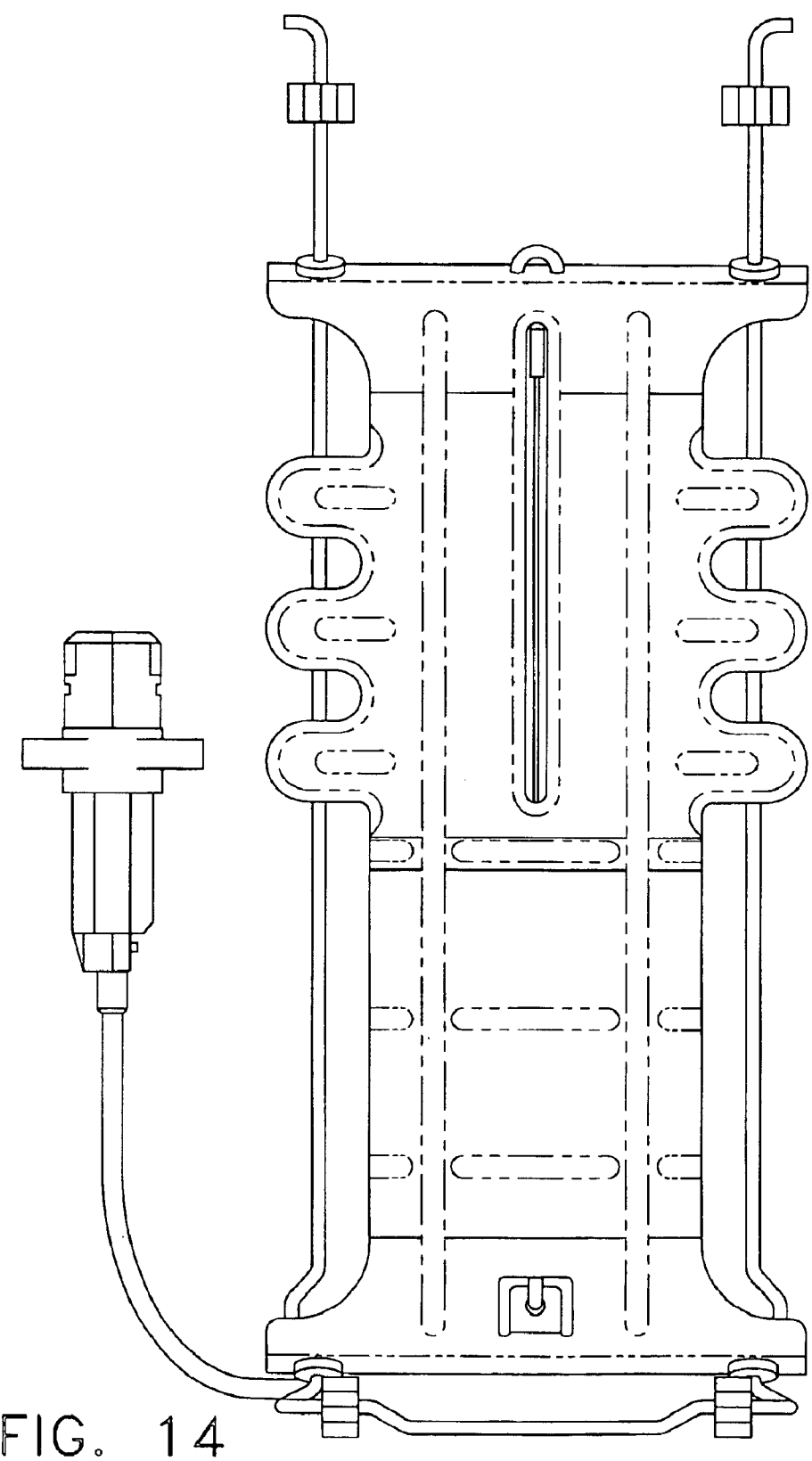
FIG. 14 is a front view of the vibrating lumbar support of the present invention un-obscured by the vibrator housing.
Figure 15:
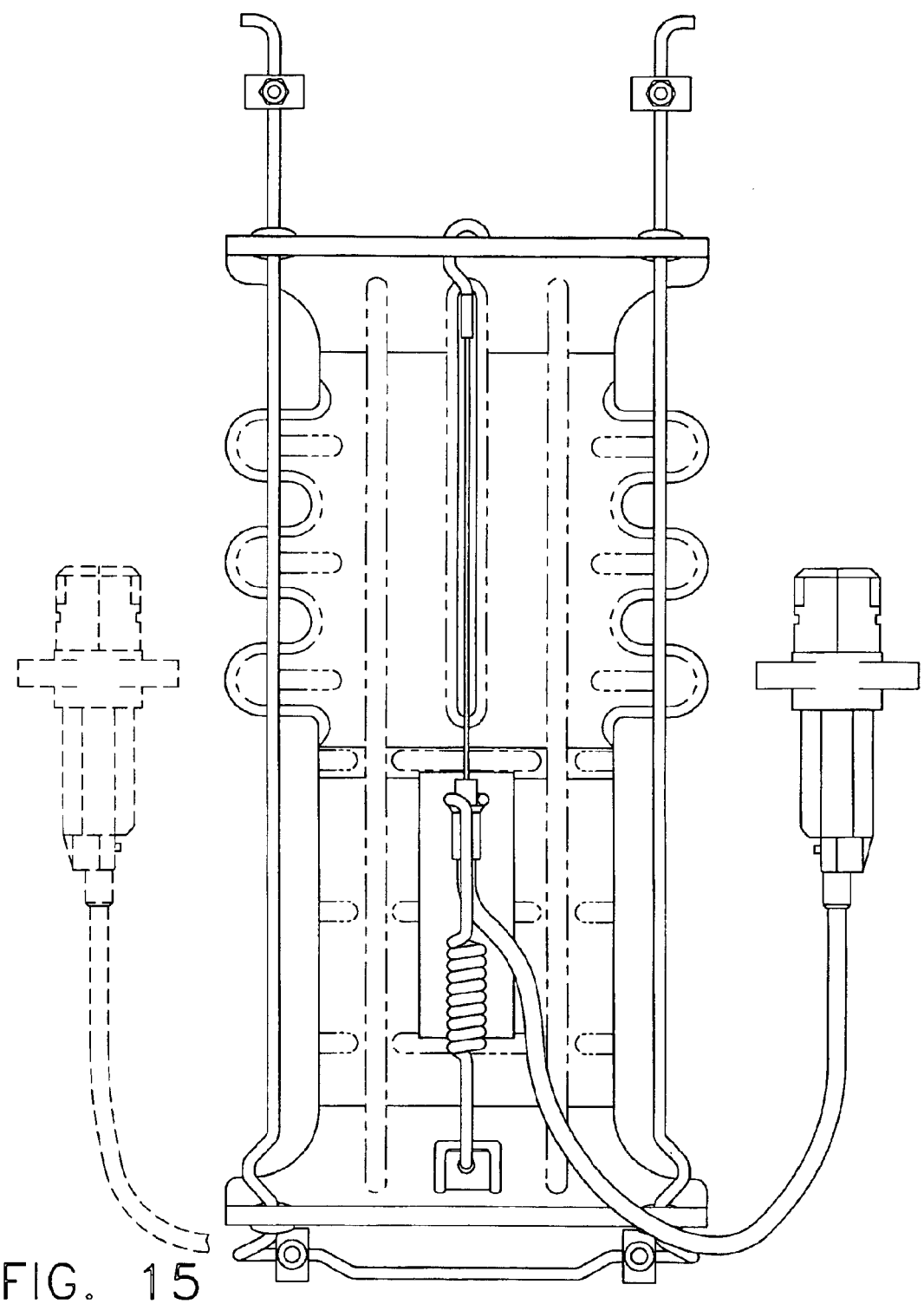
FIG. 15 is a back view of the vibrating lumbar support of the present invention un-obscured by the vibrator housing.
Figure 16:
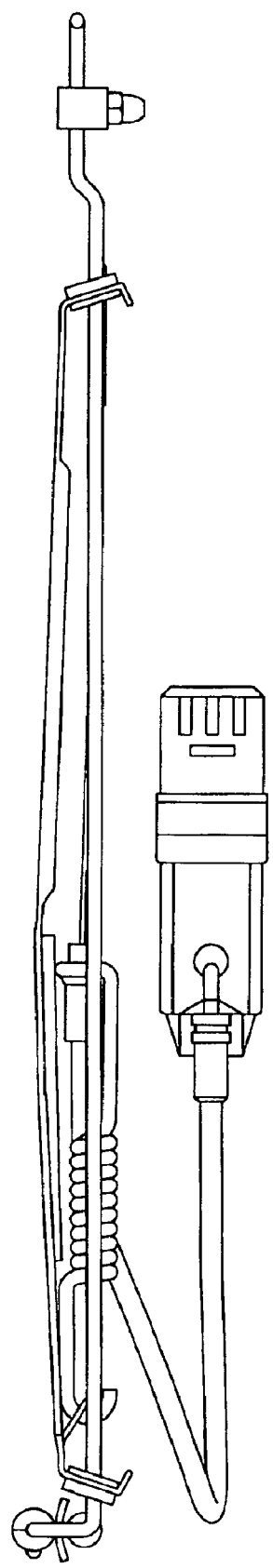
FIG. 16 is a side view of the vibrating lumbar support of the present invention un-obscured by the vibrator housing.

FIGS. 14, 15 and 16 are front, back and side views, respectively, of an alternative configuration of the traction wire, arching pressure surface, and their operative connections. The vibrator, vibration plates and vibration housing have all been omitted from these drawings in order that they not obscure the depiction of the components. These figures also further illustrate that a variety of component configurations can be used to accommodate various seat configurations, component assembly requirements or the like, and still be within the scope of the present invention.

Figure 3:
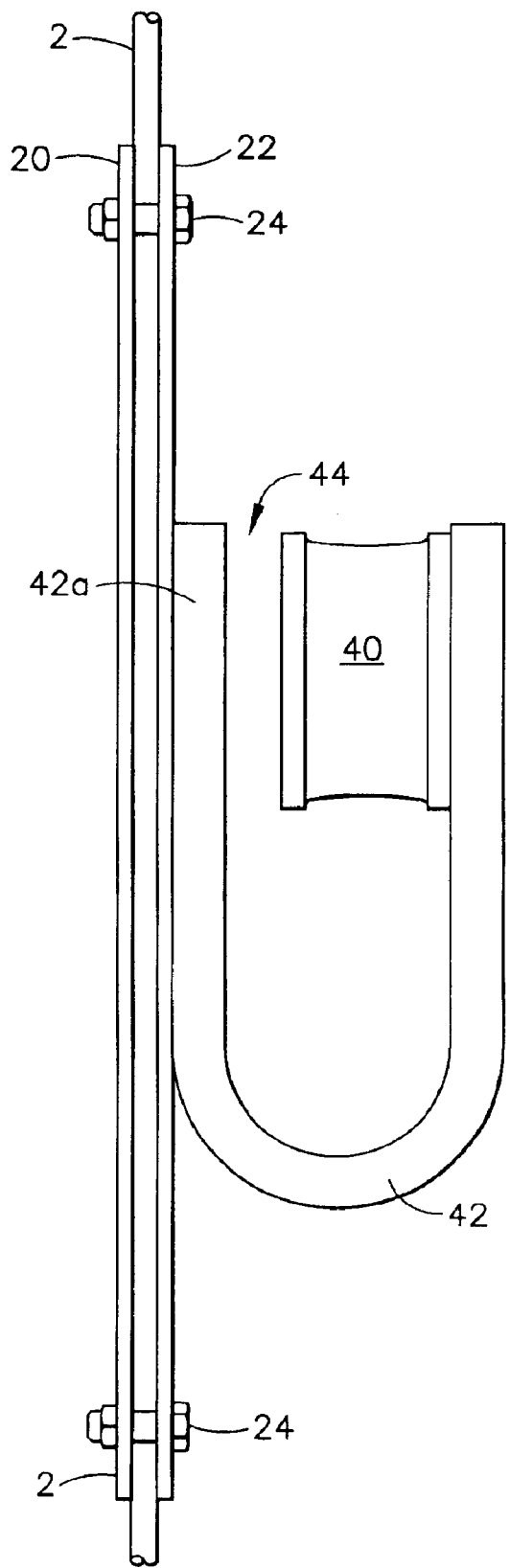
FIG. 3 is a cross-sectional view of the electromagnetic vibrator.

FIG. 3 is a cross-sectional view of the electromagnetic vibrator. Housing 26 has been removed to expose the functioning elements of the vibrator. Electromagnet 40 is mounted on a U-shaped metal vibration initiator 42. Electromagnet 40 is activated by electronic controls (not shown) in a known fashion. In a most preferred embodiment, a vibrator manufactured by Aisin is used, with a range of vibration from 1 Hz to 125 Hz. When current is applied, the heavy magnet 40 is drawn across gap 44 to vibration initiator opposite end 42a and strikes it, sending a vibration into the guide rods 2 and to the passenger. According to control settings, electrical current is released and the natural bias of the vibration initiator's shape returns electromagnet 40 to a position reestablishing gap 44, in order that another vibration cycle made happen.

In operation, a seat occupant sets the pressure surface to a desired degree of arching, which in a preferred embodiment extends through a range of 0 to 50 millimeters horizontally. Thereafter, the seat occupant may turn on the vibrator and set its range to a desired rate. The vibrator electromagnet then strikes the vibration initiator at end 42a according to the set cycle time and the vibrations are transferred through the guide rods 2, pressure surface 4 and seat cushion to the passenger.

Figure 4:
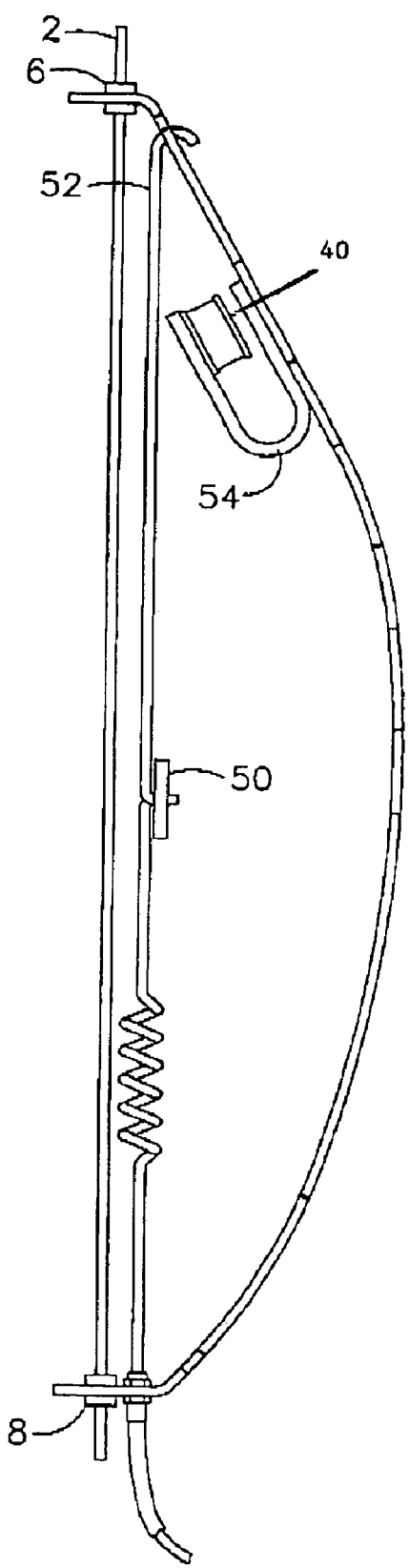
FIG. 4 is a side view of an alternate embodiment of the present invention.
Figure 5:
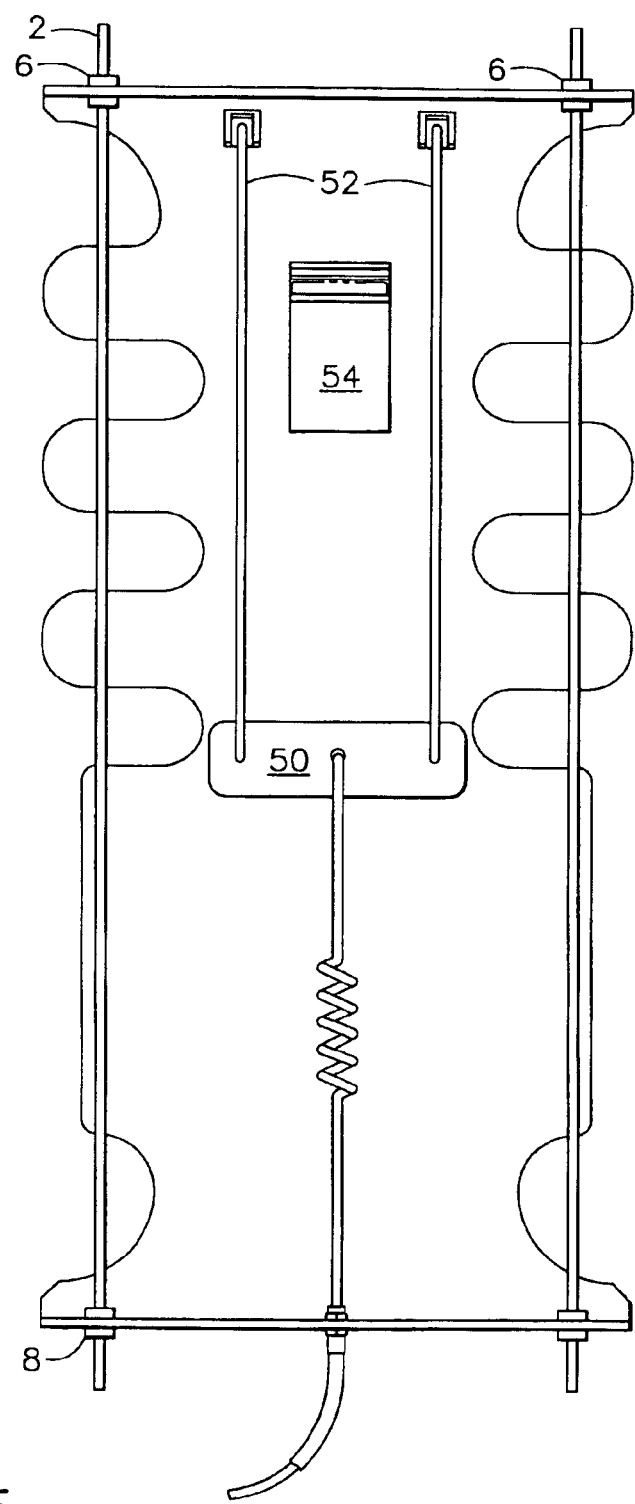
FIG. 5 is a back view of an alternate embodiment of the present invention.

FIGS. 4 and 5 depict an alternative embodiment of the present invention. Traction wires, cables, rods or the like can be deployed in lumbar supports in a variety of equivalent configurations. One such configuration is attaching the traction wire to a lever arm 50 and attaching the lever arm to two spaced apart traction rods or wires, 52 which complete connection between the pressure surface upper and lower members 6 and 8. An alternative equivalent configuration is to bifurcate the bowden cable and run two parallel traction wires along the lateral edges of the lumbar support, parallel to and near the guide wires 2. Either of these configurations create a medial space in the lumbar support assembly. Such a space is used in the present embodiment to accommodate travel of a vibrator, 54, attached directly to the back of the pressure surface, as depicted in FIGS. 4 and 5. Vibrator, 54, may be an electro-magnetic configuration as depicted in FIG. 3, or, alternatively and equivalently, a mechanical means such as a motor with an eccentric weight, other motorized means, an air pulse system or any other standard vibrator. A housing may be used that completely encloses the vibrator, provided it fits in the space between traction rods, 52, or a partially enclosing housing may be used. The vibrator may be attached to the arching pressure surface by any of a variety of known means including without limitation bolts, rivets, welds, locking tabs for insertion in pre-configured slots or the like.

Figure 6:
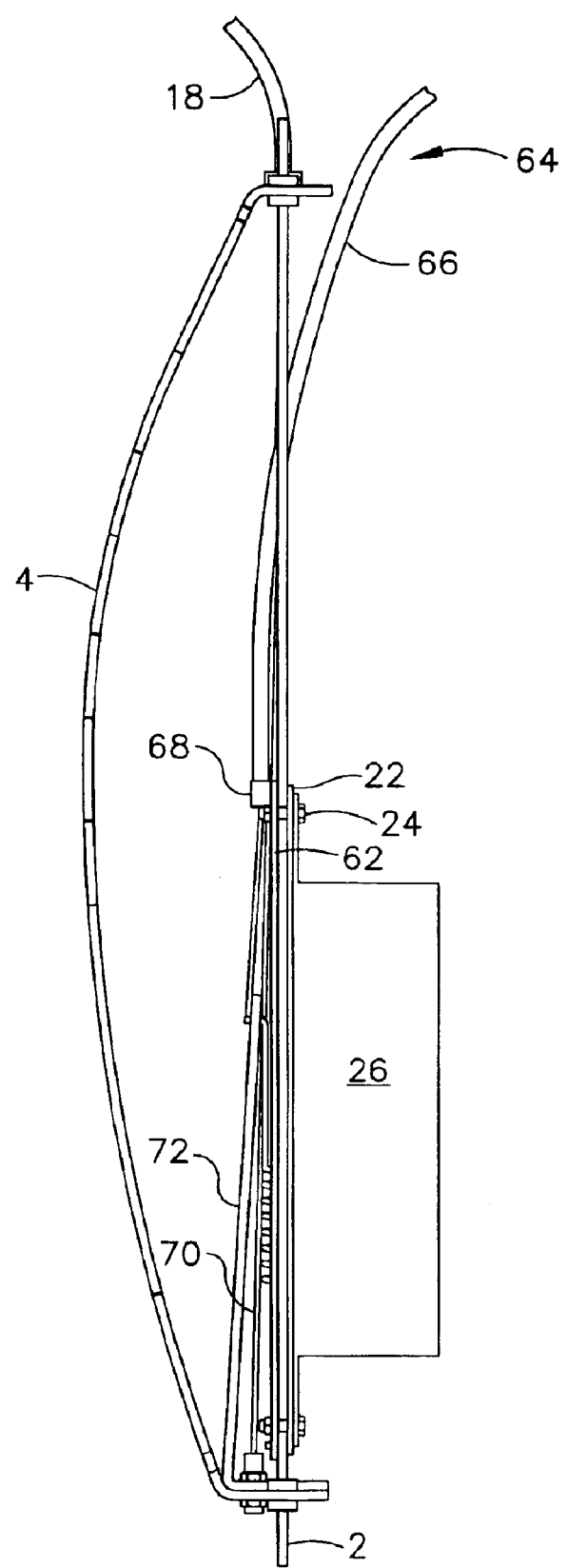
FIG. 6 is a side view of an alternate embodiment of the present invention.
Figure 7:
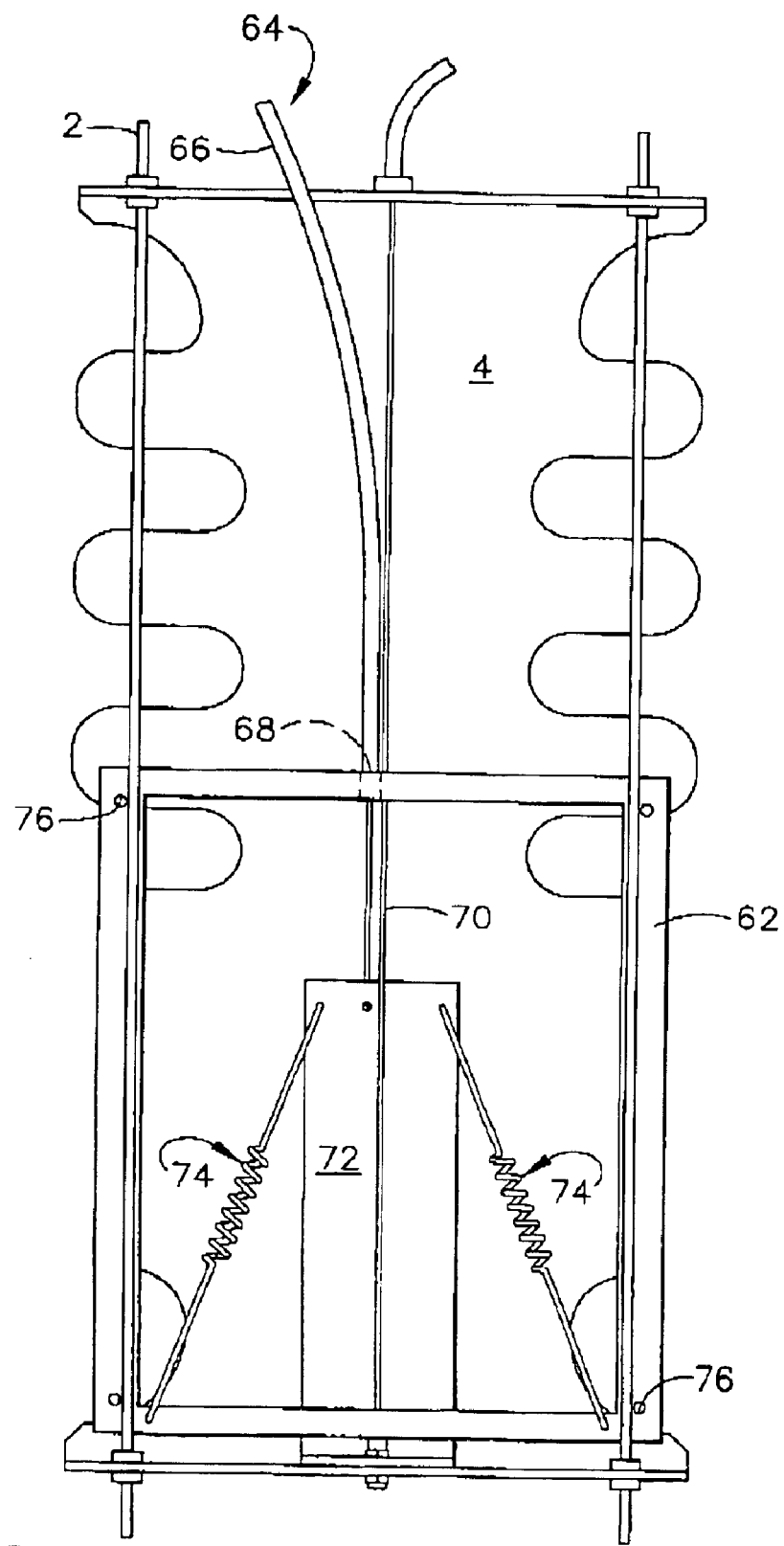
FIG. 7 is a back view of an alternate embodiment of the present invention.

FIGS. 6 and 7 depict another embodiment of the present invention. Arching pressure surface style lumbar supports have been developed that can move the entire pressure surface assembly up and down on the guide rods in order to place the apex of the arch at varying positions so that a passenger can customize the support to her preference. In these embodiments, a plate is mounted on the guide rods. The plate, 62, is an anchor for a second bowden cable, 64, which is used to raise and lower the pressure surface. Plate, 62, remains in a fixed position. Second bowden cable conduit, 66, is anchored to plate, 62 at 68. Second bowden cable wire, 70, is fixed to pressure surface, 4, through moving bracket, 72. The bracket is fixed to the lower aspect of the pressure surface. Tightening the second bowden cable, 64, draws the bracket, 72, and pressure surface, 4, upwards, without altering the shape of the pressure surface. Springs, 74, draw back down on moving bracket, 72, when second bowden cable, 64, is loosened, thereby drawing the pressure surface, 4, back down to its original position. Like the guide rods, the anchor plate, 62, remains stationary while the entire pressure surface assembly may be moved up and down along the guide rods. This vertical motion is actuated by either mechanical or, preferably, by electric motors.

This "Four Way" (in and out, up and down) configuration allows the vibrator to be fixedly attached to the anchor plate. This may be in addition to, or, preferably, instead of the inboard vibration plate 20. Operation of this embodiment is equivalent to the operation of the "Two Way" lumbar support described above.

FIG. 7, the back view of the "Four Way" embodiment, has been depicted without showing the vibration unit, so that the moving bracket, 72, and other components would not be obscured. The vibration unit, 26, is anchored to the anchor plate, 62, at mounting holes, 76.

FIG. 6, the side view of the "Four Way" embodiment, depicts the entirety of the present invention, with the vibration unit attached. Vibration unit, 26, is fixed with bolts, 24, to anchor plate, 62, with vibration plate, 22, intervening between them. Vibrations are then transferred from the vibrating unit, 26, through the vibration plate, 22, anchor plate, 62, guide rods, 2, and pressure surface, 4, to the seat occupant.

An alternative and equivalent embodiment of the present invention is to add to the vibration plate closest to the back of the arching pressure surface a perpendicular extension reaching from the vibration plate to the back of the pressure surface such that vibrations are translated directly to the pressure surface. The extension may also have a biasing device such as a spring to keep its end in contact with the pressure surface regardless of the degree of arch selected by the passenger e.g., sinuous wire 150 and extension 158 in FIGS. 10 and 11.

Figure 8:
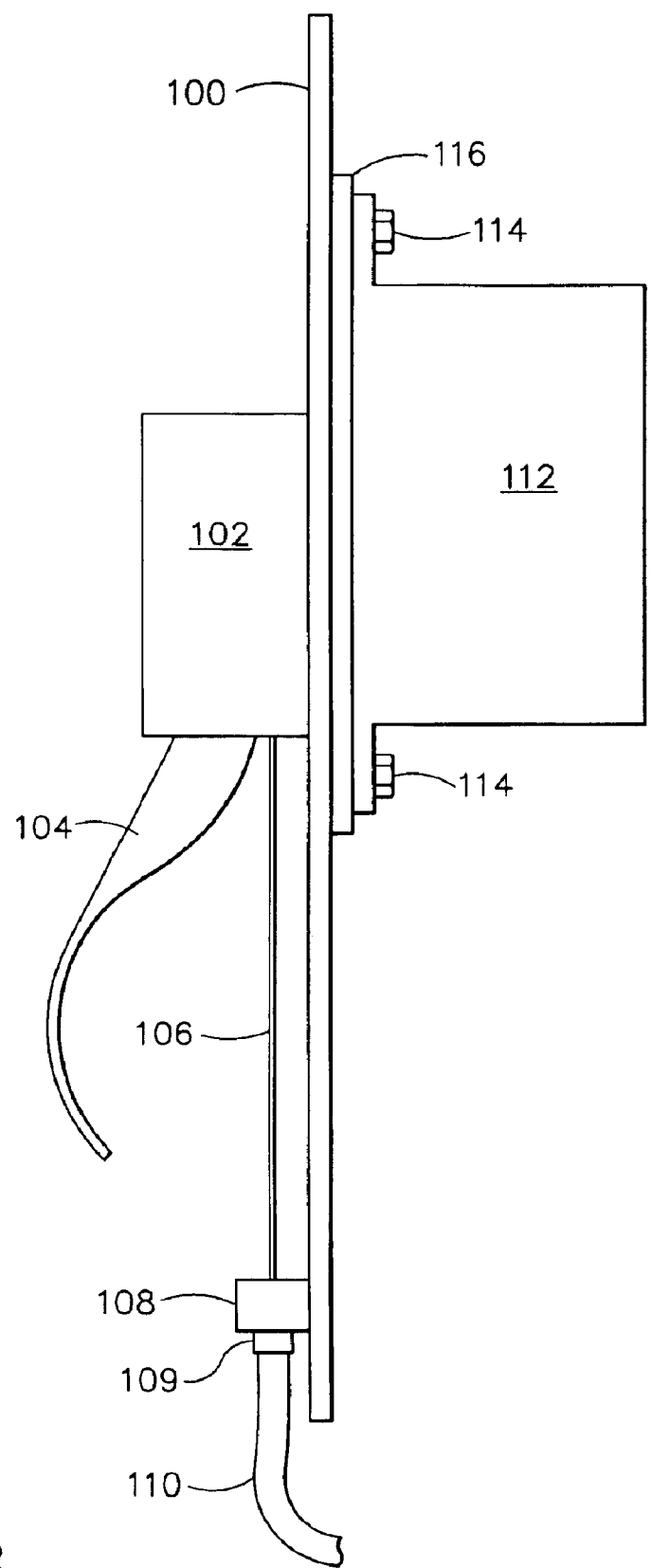
FIG. 8 is a side view of an alternate embodiment of the present invention using a paddle type lumbar support.
Figure 9:
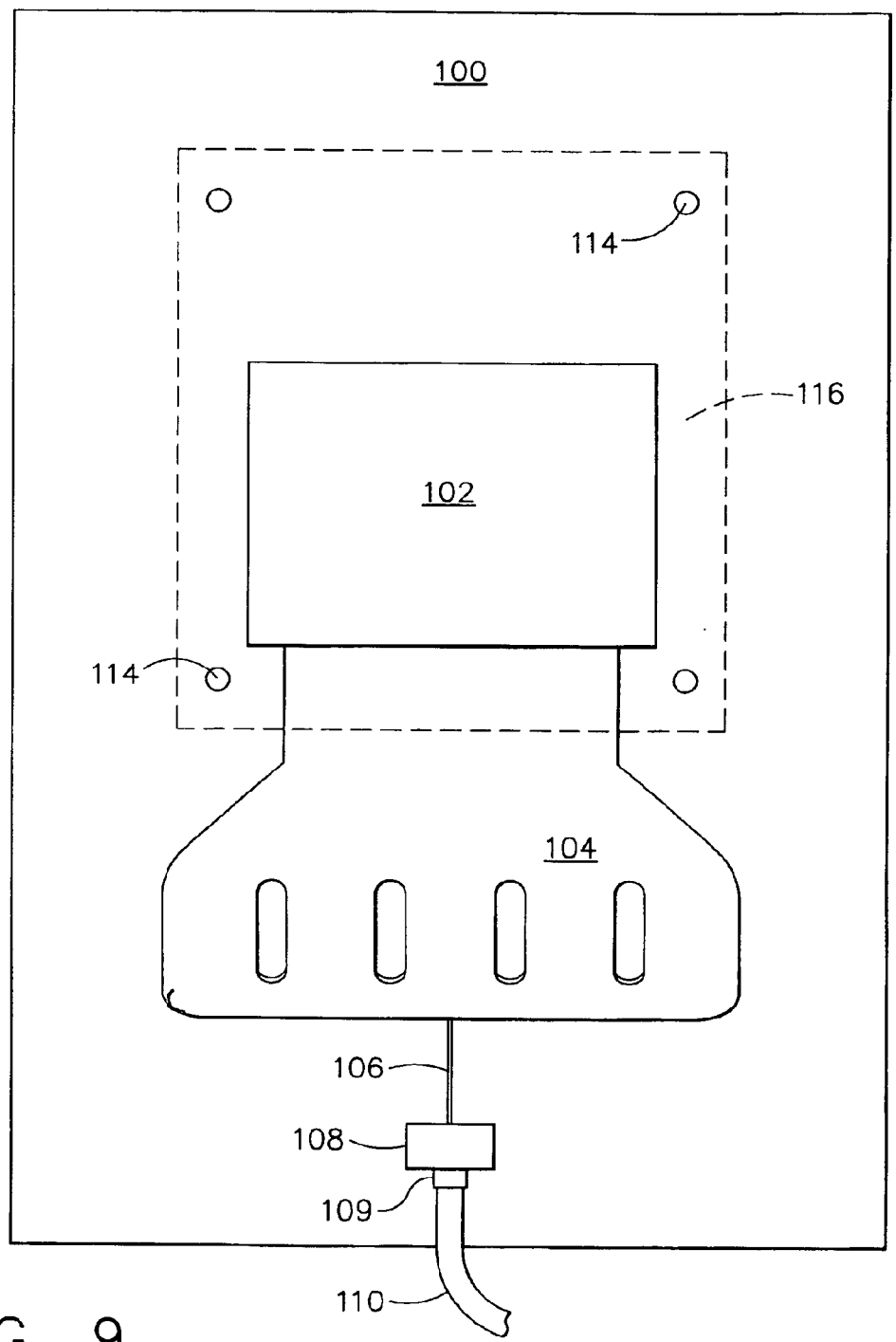
FIG. 9 is a front view of an alternate embodiment of the present invention using a paddle type lumbar support.

The present invention may alternatively be embodied in other types of lumbar support. FIGS. 8 and 9 depict embodiments of the present invention in a push paddle style lumbar support. Mounting support 100 is adapted to be mounted onto a seat frame. Mounting support 100 may be a back plate or a rod assembly. Housing 102 is fixedly attached to mounting support 100. The housing 102 contains an arcuate channel that encapsulates a correspondingly arcuate sliding end of a lumbar support paddle 104. Paddle 104 widens into a lumbar support surface at its end opposite the encapsulated end. In close cooperation, movement of the paddle within the housing extends the paddle outwards towards the passenger, as the paddles slides downward according to the curve of the channel.

Movement of the paddle is actuated by a traction cable 106 or other equivalent means. Preferably the traction is by a bowden cable. The bowden cable conduit 110 is fixedly anchored 109 to mounting support 100 at bracket 108.

Vibrator 112 is fixedly attached with bolts 114 to mounting support 100. Vibrator plate 116 is attached to the mounting support 100, the housing 102 or both. As above, operation of the vibrator transmits vibrations to the passenger through the mounting support 100, housing 102 and paddle 104.

As with the arching pressure surface type lumbar supports, paddle type supports may also be configured to raise and lower their lumbar supporting surface. Housing 102 may be mounted on a base, which base is slidingly engaged with the back plate, guide rods or other mounting support component. The housing is attached to a second traction mechanism so that the entire assembly of housing base, housing and paddle may be raised and lowered so that the lumbar supporting section of the paddle may be placed where the passenger selects.

Figure 10:
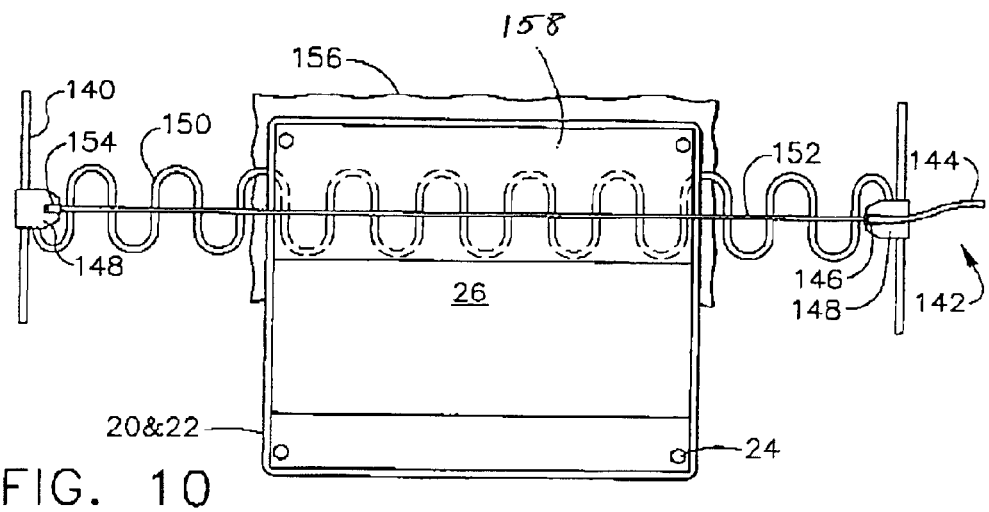
FIG. 10 is a back view of an alternate embodiment of the present invention using a sinuous wire type lumbar support.
Figure 11:
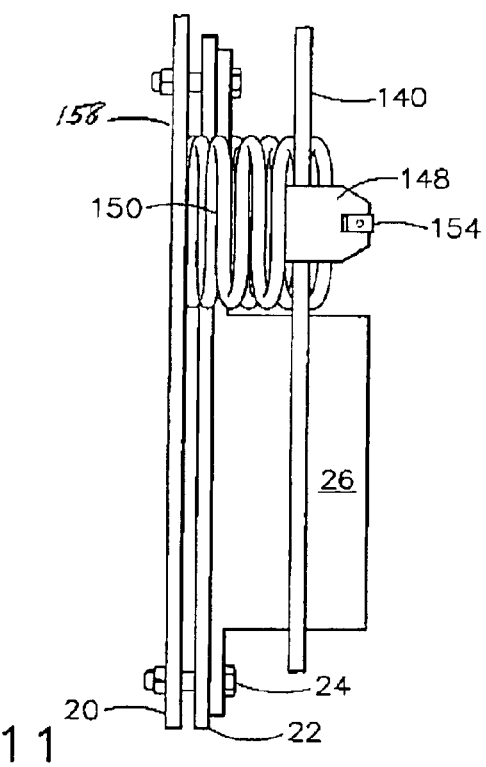
FIG. 11 is a side view of an alternate embodiment of the present invention using a sinuous wire type lumbar support.

A third type of lumbar support applies pressure to a passenger's lumbar spine through sinuous wires, as depicted in FIGS. 10 and 11. The wires are arched towards the passenger by traction applied laterally to a perimeter mounting cable, 140, fixedly attached to the seat frame (not shown). Traction wires, again actuated by any of a number of known means like a bowden cable, are hooked to the perimeter wire at or near the attachment of the sinuous lumbar support wires.

The preferred embodiment depicted in FIG. 10 uses a bowden cable, 142, to apply traction. Bowden cable conduit, 144, is fixedly attached at end, 146, to mounting bracket, 148. The flexible, semi-rigid sinuous wire, 150, is fixedly attached at either end to each of two mounting brackets, 148. Bowden cable wire, 152, extends to the other mounting bracket where it is anchored at 154. Mounting brackets, 148, may be constituted as levers, e.g., pivoting around cable 140, so that traction on them rotates the brackets outward, in turn projecting the sinuous wire, 150 towards a seat occupant.

Vibrator, 26 is directly attached to said sinuous wire, 150. Again vibrator housing, 26, is bolted to vibration plates, 20 and 22. Sinuous wire, 150, is sandwiched between vibration plates 20 and 22. In a preferred embodiment, a mat of fibrous, 156, material may also be interposed between vibration plates 20 and 22 in order to decrease wear in the sinuous wire, 150, and the vibration plates, 20 and 22. This is an option with all versions of the present invention.

In this embodiment of the present invention, the vibrator is fixedly attached to the sinuous wires by clamping the pair of vibration plates to the wires, encapsulating them. The vibrator then travels outwardly and inwardly with the arching of the wires. Vibration is directly applied to the sinuous wire(s) and then to the passenger.

Figure 12:
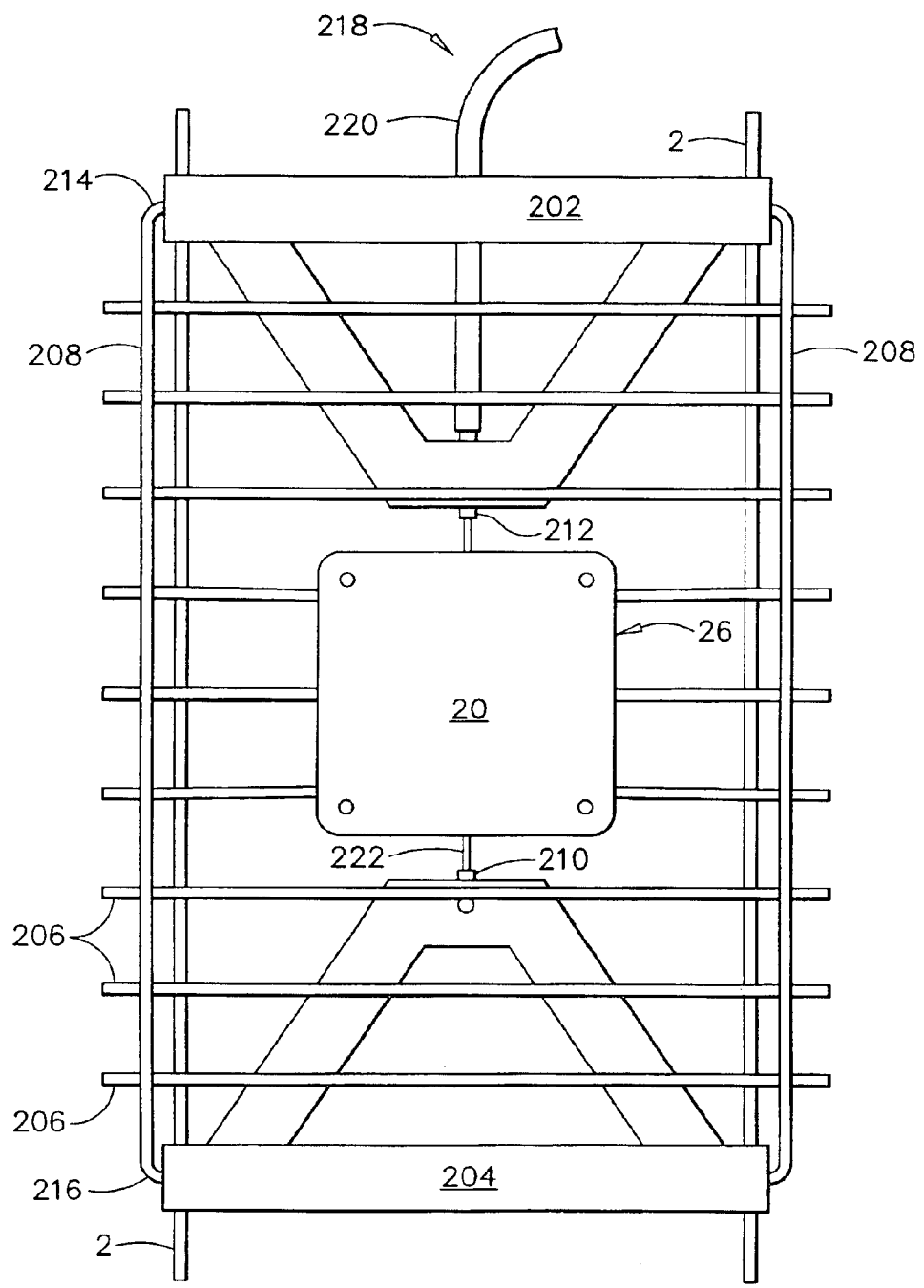
FIG. 12 is a front view of an alternative embodiment of the present invention using a wire grid.
Figure 13:
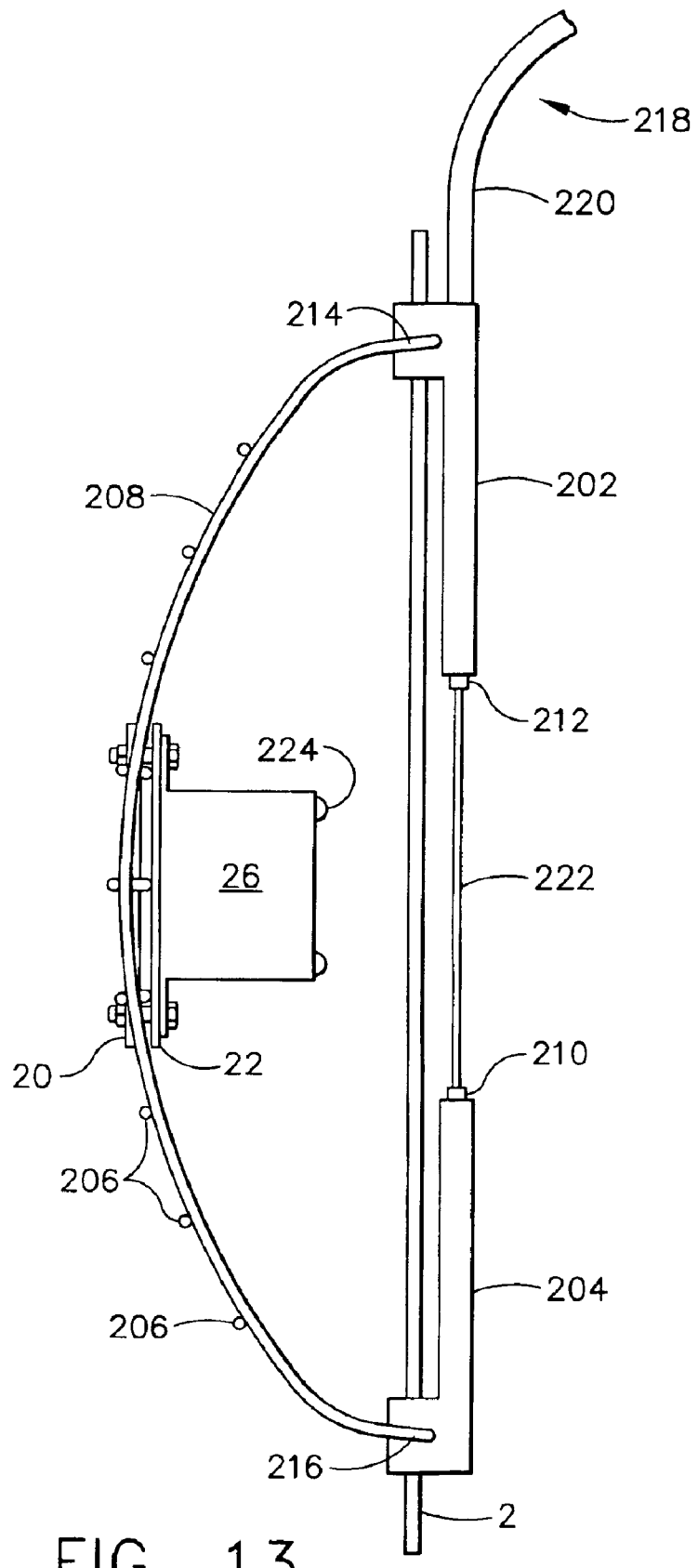
FIG. 13 is a side view of an alternative embodiment of the present invention using a wire grid.

FIGS. 12 and 13 depict another embodiment of the present invention. Another type of lumbar support uses an assembly of wire to create an archable pressure surface that can be flexed towards a seat occupant, 64, typically by using traction. In the embodiment depicted in FIGS. 12 and 13 the archable pressure surface is comprised of border elements, 208, which can be made of any material such as rods, stiff wires, stiffened cables, or other equivalent materials, provided that they flex. These border elements, 208, run generally in a vertical alignment in an intermediate lateral position. These border elements, 208, serve as mounting platforms for a plurality of transverse wire members, 206, thereby forming a wire grid. When the border elements, 208, are flexed into an arch, they carry the transverse wires, 206, outward with them.

Contracting pressure applied to the upper and lower extremities of border elements, 208, are applied via upper bracket, 202, and lower bracket 204. At least one of these mounting brackets, 202 and 204 is slidingly engaged with guide rails, 2. The other of the mounting brackets, 202 and 204, may be fixedly attached to said guide rails, 2, or also slidingly engaged with them. The guide rails, 2, being rigid, maintain movement of one or both of the brackets, 202 and 204, along a substantially flat plane that is vertically disposed. The junctures, 214 and 216, of border elements, 208, with mounting brackets, 202 and 204, may either pivot or flex to allow an outward arching curvature to be created when compressive pressure is applied to the border elements, 208, by brackets, 202 and 204.

Brackets, 202 and 204, are moved towards one another along guide rails, 2, with a bowden cable, 218. Bowden cable conduit, 220, is anchored at a medial apex of the triangular upper bracket, 202, at 212. From the conduit extends the bowden cable wire, 222, which is fixedly attached at 210 to a corresponding medial apex of the triangular lower mounting bracket, 204. Of course, an equivalent alternative is to reverse the mounting of the conduit and bowden cable wire on opposite brackets.

As before, vibration plates, 20 and 22 (22 is obscured in FIG. 12), are used to fixedly attach vibrator, 26 (also obscured), to a central number of transverse wires, 206.

The travel of the bowden cable wire, 222, over the housing of vibrator, 26, may be medicated by a guide(s) 224. Alternatively and equivalently this guide may be a roller, a groove or the like.

In a still further embodiment of this configuration of the present invention, upper and lower brackets, 202 and 204 may be a truncated triangle, double-peaked triangle, rectangle or other shapes which accommodate two bowden cables or a split bowden cable. In this configuration there would be two bowden cable conduit anchors, 212, disposed in laterally intermediate positions on one bracket and sufficiently spaced apart so that they may travel on either side of vibrator housing, 26. The split bowden cable wires would travel laterally around vibrator housing, 26, to a pair of anchors, 210, also disposed on the other bracket, 204, in laterally intermediate positions.

Alternatively and equivalently, mounting brackets, 202 and 204, may be fabricated so that they are short enough to avoid contact with the vibrator housing, 26, at all points of the vibrator's travel inwards and outwards with the archable transverse wire grid. The bowden cable wire would then need to be guided, 224, over the vibrator housing. The mounting brackets may also be fabricated to pivot or hinge at or near their juncture with the border elements, 208, and guide wires, 2, i.e. at or near junctures, 214, and 216. This would allow a pivoting motion of the mounting brackets backwards, away from the seat occupant, in order to accommodate the space needed by the vibrator housing, 26, upon the vibrator housing, 26, reaching its farthest rearward extent when the transverse wire grid is flat.

The present invention may be embodied in an electromagnetic vibrator—lumbar support combination, or, alternatively and equivalently, with other types of vibrator, including but not limited to air pulse systems and eccentrically weighted motors.

In view of the foregoing, it will be seen that the several advantages of the invention are achieved and attained.

The embodiments were chosen and described in order to best explain the principles of the invention and its practical application to thereby enable others skilled in the art to best utilize the invention and various embodiments and with various modifications as are suited to the particular use contemplated.

As various modifications could be made in the constructions and method herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A vibrating lumbar support for a seat comprising:
   at least one guide rod, said rod having upper and lower ends adapted to fixedly attach to a seat frame;
   an arching pressure surface having upper and lower members, at least one of said upper and lower members being slidingly engaged with said at least one rod;
   an arching actuator, said actuator being engaged with at least one of said arching pressure surface upper and lower members, such that at least one of said upper and lower members is adapted to move towards the other of said upper and lower members along said at least one guide rod whereby said arching pressure surface is arched;
   a vibrator, said vibrator being fixedly attached to said guide rod such that vibrations are upon actuation, transferred to a seat occupant via said guide rod and said arching pressure surface.
   an extension, said extension putting said vibrator and said pressure surface in vibrating operative cooperation by being fixedly attached to one of said vibrator and pressure surface and being biased to maintain contact with the other of said vibrator and pressure surface.

2. The vibrating lumbar support for a seat of claim 1 wherein said vibrator is electromagnetically actuated.

3. The vibrating lumbar support for a seat of claim 1 wherein said vibrator is actuated by an eccentric weight and motor.

4. The vibrating lumbar support for a seat of claim 1 wherein said vibrator is actuated by an air pulse system.

5. The vibrating lumbar support for a seat of claim 1 wherein said vibrator is fixedly attached to said arching pressure surface.

6. The vibrating lumbar support for a seat of claim 5 wherein said arching pressure surface is a wire grid.

7. The vibrating lumbar support for a seat of claim 1 wherein said arching actuator is a traction mechanism.

8. The vibrating lumbar support for a seat of claim 7 wherein said traction mechanism is a bowden cable.

9. The vibrating lumbar support for a seat of claim 1 wherein said arching actuator further comprises a means for contracting said arching pressure surface.

10. The vibrating lumbar support for a seat of claim 1 further comprising a pair of mounting brackets attached to said at least one guide rod, and wherein said extension further comprises a plate and a flexible, sinuous wire having a pair of ends, wherein said pair of ends are respectively attached to said at least one guide rod through said pair of mounting brackets, wherein said plate is attached to said flexible, sinuous wire and to said vibrator and is in contact with said pressure surface, and wherein said flexible, sinuous wire biases the plate to maintain contact with the pressure surface.

11. The vibrating lumbar support for a seat of claim 1 further comprising:
    a mounting plate fixedly attached to at least one guide rod,
    an elevator, said elevator being anchored on said mounting plate and said elevator being engaged with said arching pressure surface such that said arching pressure surface may be raised and lowered.

12. The vibrating lumbar support for a seat of claim 11 wherein said vibrator is electromagnetically actuated.

13. The vibrating lumbar support for a seat of claim 11 wherein said vibrator is actuated by an eccentric weight and motor.

14. The vibrating lumbar support for a seat of claim 11 wherein said vibrator is actuated by an air pulse system.

15. The vibrating lumbar support for a seat of claim 11 wherein said elevator is a traction mechanism.

16. The vibrating lumbar support for a seat of claim 15 wherein said elevator is a bowden cable.

17. The vibrating lumbar support of claim 16 wherein said bowden cable conduit is attached to said mounting plate and said bowden cable wire is attached to said arching pressure surface.

18. A vibrating lumbar support for a seat comprising:
a mounting support adapted to be attached to a seat;
a lumbar support having a pressure surface with a first shape and a second shape, wherein said lumbar support is attached to said mounting support;
a means for actuating said lumbar support, wherein said means for actuation changes said pressure surface from said first shape to said second shape at a position relative to said mounting support; and
a means for vibrating said lumbar support, wherein said vibrating means is attached to said lumbar support.

19. The vibrating lumbar support for a seat of claim 18 further comprising a means for positioning said lumbar support, wherein said positioning means changes said position of said lumbar support relative to said mounting support from a first position to a second position.

20. The vibrating lumbar support for a seat of claim 18 wherein said mounting support is a structure selected from the group consisting of a rod assembly, a back plate, and a bracket.

21. The vibrating lumbar support for a seat of claim 18 wherein said vibrating means is attached to said lumbar support through said mounting support.

22. The vibrating lumbar support for a seat of claim 18 wherein said vibrating means is directly attached to said lumbar support.

23. The vibrating lumbar support for a seat of claim 18 wherein said vibrating means is attached to said lumbar support through a direct attachment and through said mounting support.

24. The vibrating lumbar support of claim 18, further comprising:
at least one mounting cable adapted to be attached to a seat frame;
at least two mounting brackets attached to said at least one mounting cable;
at least one sinuous wire having two ends, each of said ends being fixedly attached to one of said at least two mounting brackets, said sinuous wire being flexible and forming said lumbar support; and
a traction cable mounted to each of said mounting brackets such that traction draws said at least two brackets together, thereby arching said sinuous wire; and
wherein said vibrating means is comprised of:
a vibrator; and
a vibration plate, said vibration plate being attached to said vibrator and attached to said sinuous wire such that vibration is transferred from said vibration plate to a seat occupant and such that said vibrator and said vibration plate travel with said sinuous wire upon said arching, wherein said sinuous wire and said vibration plate are located between the seat occupant and said vibrator.

25. The vibrating lumbar support for a seat of claim 24 Wherein said mounting cable is flexible.

26. The vibrating lumbar support for a seat of claim 24 wherein said mounting cable is rigid.

27. The vibrating lumbar support for a seat of claim 24 wherein said traction cable is a bowden cable, said bowden cable having a conduit with an end, and a cable with an end, said conduit end being anchored to one of said mounting brackets and said cable being disposed within said conduit and sliding axially within said conduit and said cable end being anchored to the other of said mounting brackets.

28. The vibrating lumbar support for a seat of claim 24 wherein said traction cable is further comprised of a first and second traction cable each mounted to each of said mounting brackets such that traction draws said mounting brackets together.

29. The vibrating lumbar support for a seat of claim 27 wherein said conduit end operatively engages a lever, said lever being also operatively engaged with one of said mounting brackets such that traction applied via said bowden cable through said lever advances said at least one sinuous wire towards a seat occupant.

30. The vibrating lumbar support for a seat of claim 27 wherein said cable end operatively engages a lever, said lever being also operatively engaged with one of said mounting brackets such that traction applied via said bowden cable through said lever advances said at least one sinuous wire towards a seat occupant.

31. The vibrating lumbar support of claim 18 wherein said lumbar support comprises a housing and a paddle, said housing being attached to said mounting support and having an arcuate channel adapted to receive a male arcuate member, and said paddle having a pressure surface end and a sliding end, said sliding end forming a male arcuate member adapted to be received by said housing arcuate channel such that travel of said sliding end in close cooperation with said arcuate channel simultaneously extends said paddle horizontally and vertically, and wherein said actuating means comprises a traction mechanism attached to said sliding end of said paddle, said traction mechanism mediating said travel of said paddle, and said traction mechanism being anchored to said mounting support.

32. A seat with a vibrating lumbar support in a seatback comprising:
at least one guide rod, said at least one guide rod having upper and lower ends attached to the seat;
an arching pressure surface having upper and lower members, at least one of said upper and lower members being slidingly engaged with said at least one guide rod;
an arching actuator, said actuator being engaged with at least one of said arching pressure surface upper and lower members, such that at least one of said upper and lower members is adapted to move towards the other of said upper and lower members along said at least one guide rod, whereby said arching pressure surface is arched out toward the seatback; and
a vibrator, said vibrator being fixedly attached to said guide rod such that vibrations are transferred to a seat occupant via said guide rod and said arching pressure surface, wherein said arching pressure surface is located between the seatback and said vibrator.

33. The seat with a vibrating lumbar support of claim 32 wherein said vibrator is electromagnetically actuated.

34. The seat with a vibrating lumbar support of claim 32 wherein said vibrator is actuated by an eccentric weight and motor.

35. The seat with a vibrating lumbar support of claim 32 wherein said vibrator is actuated by an air pulse system.

36. The seat with a vibrating lumbar support of claim 32 wherein said vibrator is fixedly attached to said arching pressure surface.

37. The seat with a vibrating lumbar support of claim 32 further comprising:
a mounting plate slidingly engaged with said at least one guide rod, said mounting plate being fixedly attached to said arching pressure surface, and said mounting plate also being fixedly attached to said arching pressure surface; and a mounting plate elevator, said elevator being engaged with said mounting plate such that said plate and said attached pressure surface may be raised and lowered.

38. The seat of claim 32 wherein said arching pressure surface is a wire grid.

39. The seat of claim 32 wherein said arching actuator is a bowden cable.

40. A vibrating lumbar support for a seat comprising:

at least one mounting cable attached to the seat;

at least two mounting brackets attached to said at least one mounting cable;

at least one sinuous wire having two ends, each of said ends being fixedly attached to one of said at least two mounting brackets, said sinuous wire being flexible;

a traction cable mounted to each of said at least two mounting brackets such that traction draws said at least two brackets together, thereby arching said sinuous wire;

a vibrator; and a vibration plate, said vibration plate being attached to said vibrator and attached to said sinuous wire such that vibration is transferred from said vibration plate to a seat occupant and such that said vibrator and said vibration plate travel with said sinuous wire upon said arching, wherein said sinuous wire and said vibration plate are located between the seat occupant and said vibrator.

* * * * *

UNITED STATES PATENT AND TRADEMARK OFFICE
CERTIFICATE OF CORRECTION

PATENT NO. : 6,918,884 B2
DATED : July 19, 2005
INVENTOR(S) : Knelsen et al.

It is certified that error appears in the above-identified patent and that said Letters Patent is hereby corrected as shown below:

Column 8,
Line 11, reads "said arching pressure surface." should read -- said arching pressure surface; and --.

Signed and Sealed this

Twentieth Day of September, 2005

JON W. DUDAS
*Director of the United States Patent and Trademark Office*